UNITED STATES PATENT OFFICE.

ROBERT WICHMANN, OF HAMBURG, GERMANY.

EFFERVESCING MIXTURE FOR BEVERAGES.

SPECIFICATION forming part of Letters Patent No. 541,255, dated June 18, 1895.

Application filed February 23, 1895. Serial No. 539,480. (No specimens.) Patented in England June 27, 1894, No. 12,503; in France June 28, 1894, No. 239,650, and in Belgium July 9, 1894, No. 110,909.

*To all whom it may concern:*

Be it known that I, ROBERT WICHMANN, of the city of Hamburg, in the Empire of Germany, have invented a new and useful Improvement in Effervescent Mixtures for Beverages, (for which there have been granted Letters Patent of Great Britain, No. 12,503, dated June 27, 1894; a brevet of France, No. 239,650, dated June 28, 1894, and a brevet of Belgium, No. 110,909, dated July 9, 1894,) of which the following is a specification.

With the effervescent powders, effervescent bonbons or the like heretofore to be had, only an instantaneous sparkling effect can be obtained and the effervescing beverage so formed must be drunk up almost immediately since the mixture quickly dissolves and the effervescing process and thus the refreshing effect thereupon ceases.

The object of this invention is to provide means for producing a beverage which for a longer time keeps its agreeably refreshing and continually effervescing qualities. This is attained by a mixture of small comfit-grains of which about one half contain in them a granular or solid acid (for instance citric or tartaric acid, &c.), and the other half an alkaline bicarbonate (such as bicarbonate of soda). Each of these comfit-grains is coated with a thin layer or shell of pure sugar which latter prevents the chemical agents from becoming dissolved too rapidly.

As soon as the mixture of comfit-grains, to which if desired, an aromatic mixture of sugar powder may be added or the grains themselves may be covered with aromatic substances, is put in water, the surrounding layer of the grains slowly dissolves, the chemical agencies underneath become free little by little and a strong and continuous development of carbonic acid takes place which for instance in slightly sugared white wine produces absolutely the taste and appearance of champagne. The duration of the effervescent effect which can be determined at will by choosing larger or smaller comfit-grains, may last from ten minutes to half an hour. In this mixture, until it is required to be used, not only is every grain of alkaline bicarbonate separately and completely insulated by sugar from the acid, but every grain of acid is separately and completely insulated by sugar from the alkaline bicarbonate and hence the mixture is not subject to deterioration from ordinary atmospheric causes but will keep for a very long time.

Having now particularly described and ascertained the nature of this invention and in what manner the same is to be performed, I declare that what I claim is—

A mixture for effervescent beverages composed in part of comfit grains consisting severally of an alkaline bicarbonate and an inclosing and insulating shell of sugar and in part of comfit grains consisting severally of a solid acid and an inclosing and insulating shell of sugar, substantially as herein set forth.

In witness whereof I have signed this specification in presence of two witnesses.

ROBT. WICHMANN.

Witnesses:
A. SCHAPER,
RICH. BÖSCHKE.